Patented Feb. 6, 1940

2,189,572

UNITED STATES PATENT OFFICE 2,189,572

PROCESS FOR FRACTIONATING RESINOUS PRODUCTS

Paul D. Watson, Alexandria, Va.; dedicated to the free use of the People in the territory of the United States No Drawing. Application September 1, 1938, Serial No. 227,984

3 Claims. (Cl. 260—78)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

The object of my invention is to improve and facilitate the process for production of resinous products made principally from lactic acid by means of a new fractionation process which makes possible the separation of the soft fraction of low molecular weight from the hard more highly polymerized fraction of the resin. My process will increase the utility of the resins made from lactic acid, a by-product of the dairy industry, which will be thus indirectly benefited.

I have found that, ordinarily, a lengthy period of curing by heating is necessary to form a hard, water and alcohol resistant resin derived principally from dehydrated lactic acid. However, by means of my process the soft more soluble fraction of the partially cured resin may be expeditiously separated from the hard more highly polymerized fraction, thereby increasing the hardness and insolubility of the latter, and shortening the period of curing. The soft light colored fraction after removal of the solvent may be utilized for the purposes in which this type of resin is suitable, for example, in adhesives, or it may be further polymerized by heating until the desired degree of hardness is attained.

The medium hard resins made from dehydrated lactic acid by the addition of a small proportion of hardening agents, such as glycerol, furfurol, lactose, etc., and partially cured by baking at 150° C. for several days may be usually dissolved in acetone, benzene or a mixture of these two solvents. I have discovered that the addition of certain liquids to this resin solution after thoroughly mixing causes the darker hard portion of the resin to precipitate, while the light-colored soft portion of the resin remains in solution. The insoluble hard resin settles to the bottom and may be readily separated from the soluble resin fraction.

The liquids which serve to thus fractionate the resins are the aliphatic hydrocarbons derived from petroleum, such as Skellysolve (H) B. P. 69–96° C., Solvesso #3, B. P. 185–216° C., petroleum ether B. P. 30–65° C. and heptane, B. P. 90–100° C., or terpenes, for example, turpentine or cymene.

In practicing my invention, I have found that in order to effect the precipitation of the hard fraction of the resin a volume of petroleum solvent or terpene about equal to the volume of the resin solution should be added. I have also found that the yield of soft resin fraction may be increased by the addition of absolute ethyl alcohol to the acetone-benzene solution of resin before precipitation of the resin. However, due to the fact that ethyl alcohol acts as a mutual solvent, its use in the resin solution requires the addition of a considerable excess of the precipitating hydrocarbon or terpene liquid in order to cause separation of the resin.

The following examples are illustrative of the method of carrying out my invention:

Example I

A mixture of equal parts of acetone and benzene containing 216 grams of resin per liter was treated 4 times with Skellysolve (H) (B. P. 69–96° C.). Each time the precipitated resin was drawn off, and redissolved in a fresh portion of the acetone and benzene solution. The resin fractions remaining in solution after each precipitation were combined, and the resin recovered by evaporation of the solvent and subsequent baking at a temperature of 150° C. for 23 hours. The yield of light colored soft resins was 63% of the total weight of the original resin.

Example II

The same resin solution as in Example I was used and the experiment performed in the same way except that some absolute ethyl alcohol was added before each precipitation, which required a greater amount of Skellysolve than was used in Example I. However, the total amount of solvent acetone, benzene and alcohol was slightly less than in Example I, but the yield of soluble soft resin was 68% of the original resin.

Example III

A mixture of equal parts of acetone and benzene containing 261 grams of resin per liter was thoroughly mixed with turpentine in slight excess, and after standing the precipitated resin was drawn off. The portion containing the soluble resin was evaporated to dryness and baked for 3 hours at a temperature of 150° C. to obtain the soft resin. The yield was 28% of the weight of the original resin.

Example IV

The test was similar to Example III except that the volume of the resin solution was increased 80% by the addition of absolute ethyl alcohol. It was necessary to add double the amount of turpentine used in Example III in order to precipitate the resin. The soluble fraction of the resin was 65% of the total resin.

Tests made on the resin fractions after removal of the solvents by baking at a temperature of 150° C. for several hours showed a marked difference. The precipitated resin fractions were hard while the soluble fractions were soft and tacky at room temperature. The precipitated resin fractions were much darker in color than the dissolved fractions. The precipitated resin fractions were superior to the dissolved resin fraction in resistance to the action of water and alcohol. Finally, the precipitated resin fractions when compared to the original untreated resins showed increased hardness and resistance to the action of water and alcohol.

It is thought that this invention and its attendant advantages will be understood from the preceding description, and it will be apparent that various changes may be made in the steps of the process without departing from the scope and spirit of the invention, the process hereinbefore described being merely a preferred embodiment thereof.

Having thus described my invention, what I claim for Letters Patent is:

1. A process for fractionating a resin derived principally from lactic acid, which comprises dissolving the resin in a solvent, thence precipitating the more highly polymerized fraction with a precipitating agent selected from the group consisting of liquid petroleum and terpene hydrocarbons, thence separating the soluble less highly polymerized fraction, repeating the procedure with the precipitated fraction until the desired degree of separation is attained, thence removing the solvent from the resin fractions, and thence subjecting the fractionated resin to the action of heat at a temperature of substantially 150° C.

2. A process for fractionating a resin derived principally from lactic acid, which comprises dissolving the resin in a mixture of acetone and benzene, thence precipitating the more highly polymerized fraction with a liquid petroleum hydrocarbon, thence separating the soluble less highly polymerized fraction, repeating the procedure with the precipitated fraction until the desired degree of separation is attained, thence removing the solvent from the resin fractions, and thence subjecting the fractionated resin to the action of heat at a temperature of substantially 150° C.

3. A process for fractionating a resin derived principally from lactic acid, which comprises dissolving the resin in a mixture of acetone and benzene, thence adding absolute ethyl alcohol to the solution, thence precipitating the more highly polymerized fraction with a terpene hydrocarbon, thence separating the soluble less highly polymerized fraction, repeating the procedure with the precipitated fraction until the desired degree of separation is attained, thence removing the solvent from the resin fractions, and thence subjecting the fractionated resin to the action of heat at a temperature of substantially 150° C.

PAUL D. WATSON.